United States Patent [19]
Whitmer

[11] 3,969,248
[45] July 13, 1976

[54] POOL FILTERING SYSTEM

[75] Inventor: Charles C. Whitmer, Strongsville, Ohio

[73] Assignee: The Whitmer Company, Cleveland, Ohio

[22] Filed: Nov. 1, 1974

[21] Appl. No.: 520,017

[52] U.S. Cl. .............................. 210/126; 210/169; 210/193; 210/333 R; 210/340
[51] Int. Cl.² ................... E04H 3/16; B01D 29/38
[58] Field of Search .......... 210/169, 119, 198, 205, 210/206, 209, 410, 411, 499, 126, 193, 333, 340; 137/268; 222/161

[56] References Cited
UNITED STATES PATENTS

| | | | |
|---|---|---|---|
| 611,314 | 9/1898 | Cullinan | 210/119 |
| 2,468,603 | 4/1949 | Pew | 210/410 X |
| 2,720,314 | 10/1955 | Booth | 210/410 |
| 3,327,866 | 6/1967 | Poll et al. | 210/499 |
| 3,456,801 | 7/1969 | Bowles | 137/268 X |
| 3,502,116 | 3/1970 | Crawford | 210/499 |
| 3,512,644 | 5/1970 | Nash | 210/169 |
| 3,581,895 | 2/1969 | Howard et al. | 210/169 |
| 3,672,508 | 6/1972 | Simm | 210/169 X |
| 3,786,921 | 1/1974 | Johnson | 210/169 X |
| 3,859,214 | 1/1975 | Lang et al. | 210/169 |

*Primary Examiner*—Theodore A. Granger
*Attorney, Agent, or Firm*—Baldwin, Egan, Walling & Fetzer

[57] ABSTRACT

A pool filtering system is shown. Dirty water from the pool passes into a stilling or surge chamber under the control of a float valve, then passes through a large particle interceptor screen into a filter element chamber which has a plurality of generally vertically extending filter elements, each having a coarse core covered by an outer layer of sufficiently fine mesh to retain an outer coating of diatomaceous silica, then through the filter elements in parallel to a manifold at the bottom of the tank which leads to the recycling pump and directs the clean water back to the pool. A diatomaceous silica dry slurry feeder is installed above the filter tank. A hypochlorinator is effective in the clean water line going back to the pool. A heat exchanger may be mounted in the stilling chamber, if desired. An air reservoir is kept filled with compressed air under about 40 pounds per square inch and backwashing is accomplished by exploding or ramming the air from the air reservoir through the manifold system and up and out through the filter elements removing the spent diatomaceous silica which falls to the filter tank floor. Preferably the top of the filter tank is open so that the condition of the filter elements may be inspected at all times.

3 Claims, 14 Drawing Figures

POOL FILTERING SYSTEM

An object of the present invention is to provide a pool filtering system providing stilling and filter element tank space constructed of metal coated against corrosion for a long life span.

Another object is to provide rugged filter elements arranged to be coated by diatomaceous silica and strong enough to withstand 150 pounds differential pressure across the elements when back-washing by compressed air.

Another object of the invention is to provide a flow control system whereby water flows from the pool, through the filter elements, and back to the pool in an orderly and controlled manner.

Another object of the invention is to provide a diatomaceous silica slurry feeder, a hypochlorinator, and, if necessary, a heat exchanger, all of which are of fairly simple construction and efficiently constructed for long life.

Other objects and advantages of the invention will be apparent from the accompanying drawings and description and the essential features thereof will be set forth in the appended claims. In the drawings.

FIG. 13 is a top plan view of the same; while

Figure 2:
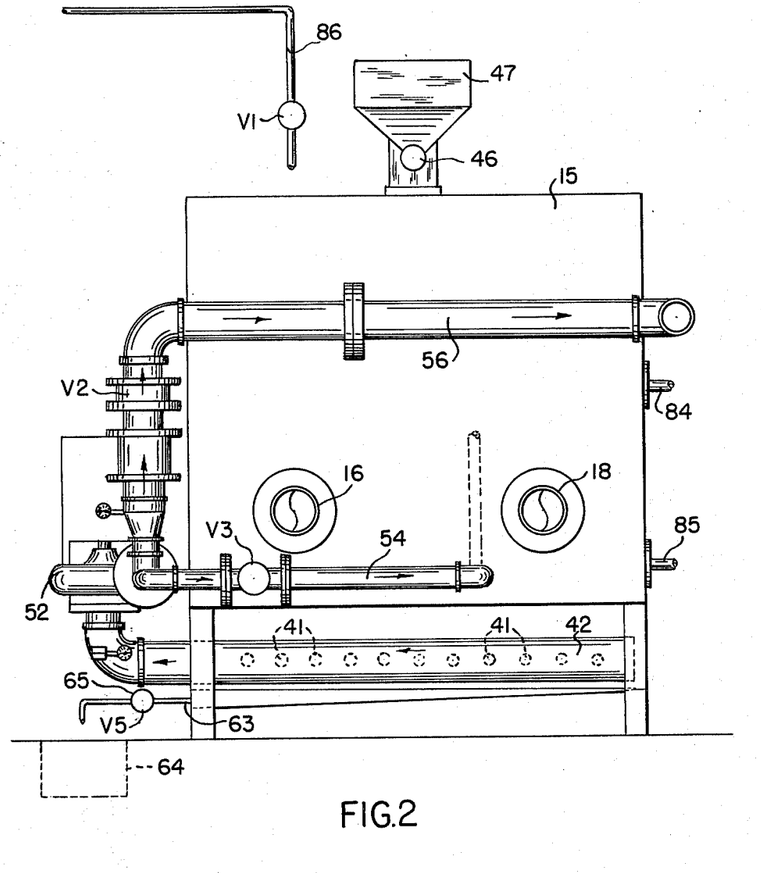
FIG. 2 is a side elevational view taken from the lower side of FIG. 1.
Figure 3:
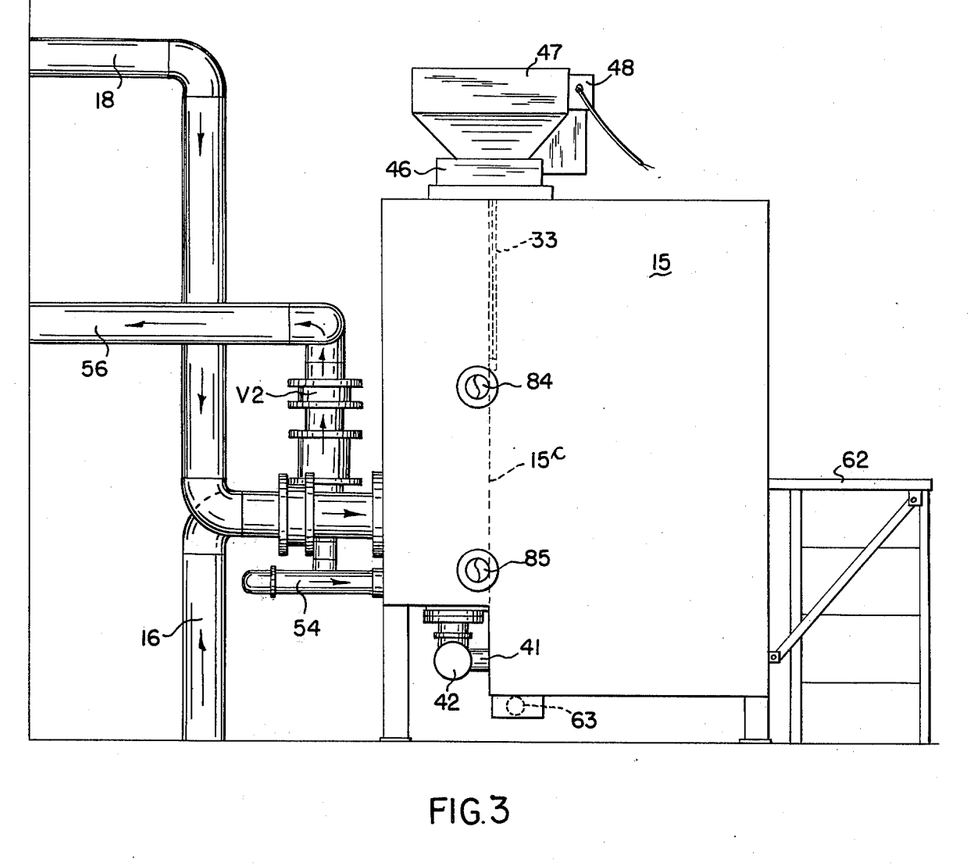
FIG. 3 is an elevational view taken from the right-hand side of FIG. 1 but omitting the compressed air reservoir.

It should be understood that in actual commercial use, this system is put together to fit the local circumstances at each pool location. The stilling chamber and the filter element chamber need not be side-by-side in a single structure with a partition between them as shown in FIGS. 1 through 3 and the water lines, recycling lines, air back-wash lines and the location of the diatomaceous silica feeder and the hypochlorinator and the heat exchanger and other units need not be positioned exactly as shown in the drawings, but only in a position where each can perform its desired function.

Figure 1:
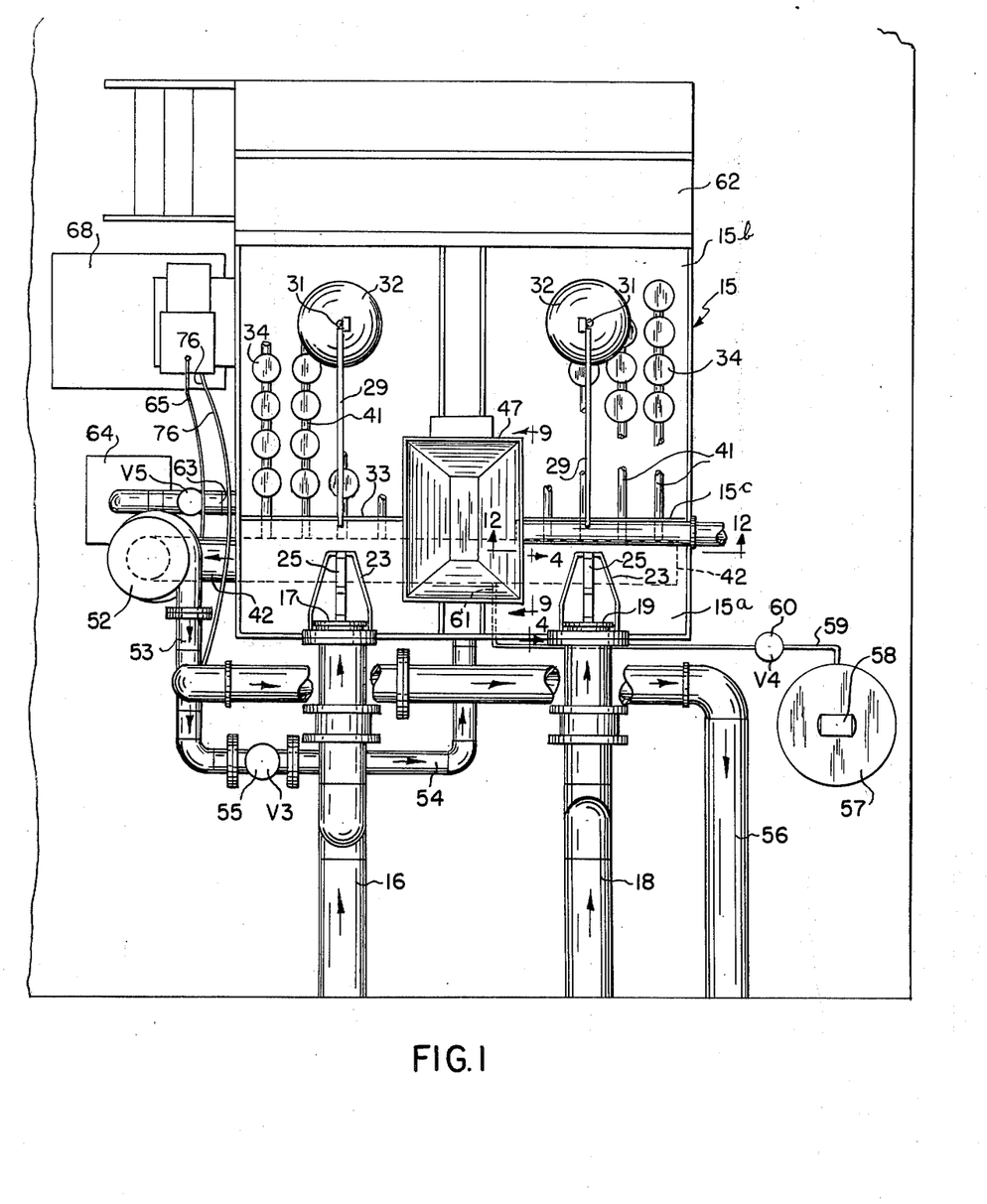
FIG. 1 is a top plan view of one embodiment of the invention.
Figures 4, 5, 6:
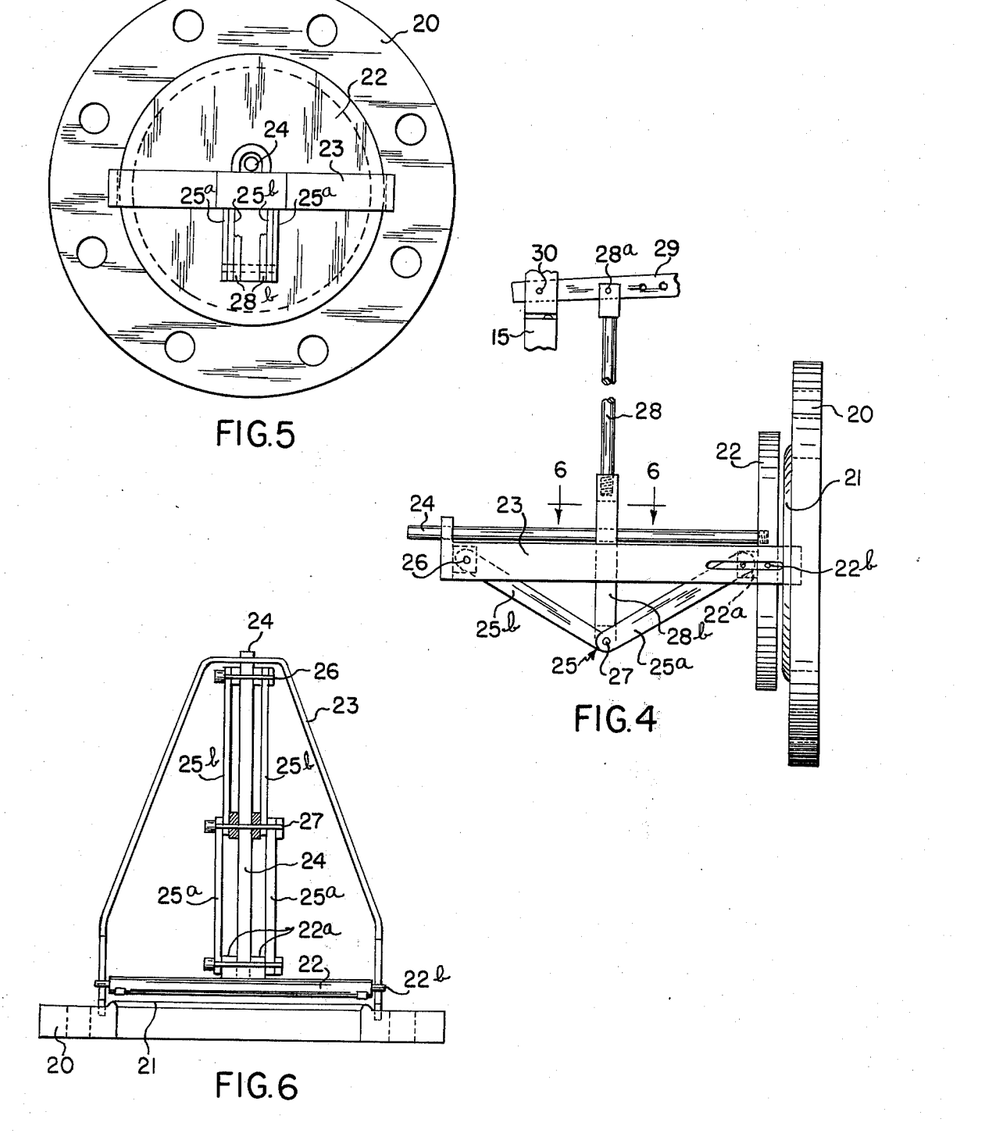
FIG. 4 is a fragmental elevational view of a float valve control taken along the line 4—4 of FIG. 1.
FIG. 5 is an end view thereof taken at the left-hand side of FIG. 4.
FIG. 6 is a plan view taken along the line 6—6 of FIG. 4.

The tank 15 is shown in FIG. 1 as having a stilling or surge chamber 15a separated from a filter element chamber 15b by a vertical partition 15c. This tank is constructed for a long life and in a perfected from has a heavy plastic liner, as for instance of epoxy-resin, bonded to bright metal steel and impervious to acids, caustic oils and fats, and water submersion. The inlet line 16 is connected between the main body of water in the pool and passes through a control valve 17 into the stilling chamber 15a. Where a swimming pool is involved, a second return line 18 from the pool is connected with the wave trough and is controlled by valve 19 where it enters the stilling chamber. In any case, the valves 17 and 19 are alike and are shown in more detail in FIGS. 4, 5 and 6. A valve seat plate 20 is connected to the tank 15 and has an annular rib 21 of uniform height extending in a raised circle. The coacting valve plate 22 has a flat surface adapted to engage the rib 21 when the valve is closed. These valves are purposely arranged with their seating surfaces in a vertical planes so that any solid material caught accidentally between 21 and 22 falls down to the bottom of the tank due to oscillation of the valve. The valve is opened and closed by a toggle structure supported on a bracket 23 which is fixed on plate 20. At its outer end, the bracket slidingly supports a rod 24 which is fixed to the valve plate 22. The toggle 25 has a link 25a pivotally connected to an ear 22a of the valve plate and the toggle link 25b is pivotally fixed at 26 to the bracket 23. The links are pivotally connected at 27 to an upwardly extending rod 28 which at its upper end is pivotally connected at 28a to the swinging arm 29 which is pivotally connected at 30 to the tank 15. At its outer end, each arm 29 carries a rod 31 which has a floating ball 32 at its lower end. Thus, as the water level in stilling chamber 15a rises, each float 32 will lift its associated arm 29 and connected rod 28 to move the toggle 25 toward a valve closing position. It will be noted that the parts are adjustable so that the inflow from pipes 16 and 18 may be adjustable. A common adjustment in a swimming pool would be to permit about 80 percent of the flow through the line 18 and about 20 percent of the flow through the line 16.

Figures 12, 14:
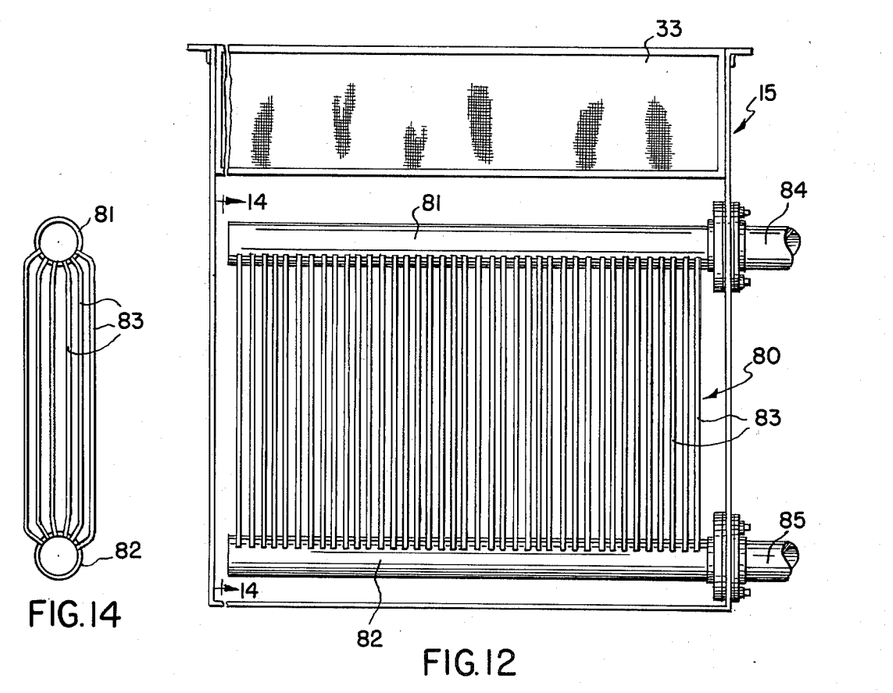
FIG. 12 is an enlarged elevational view of a heat exchanger taken along the line 12—12 of FIG. 1.
FIG. 14 is an end view of the heat exchanger taken along the line 14—14 of FIG. 12.
Figure 13:
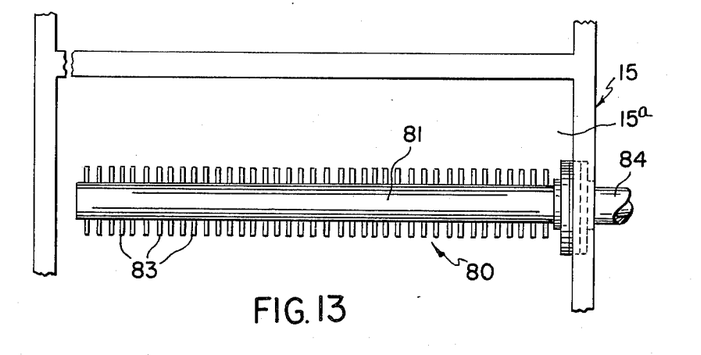

A large particle interceptor for leaves, lint, and the like is shown at 33 in FIGS. 1 and 12 as mounted on top, and in vertical line with, the partition wall 15c.

Figure 8:
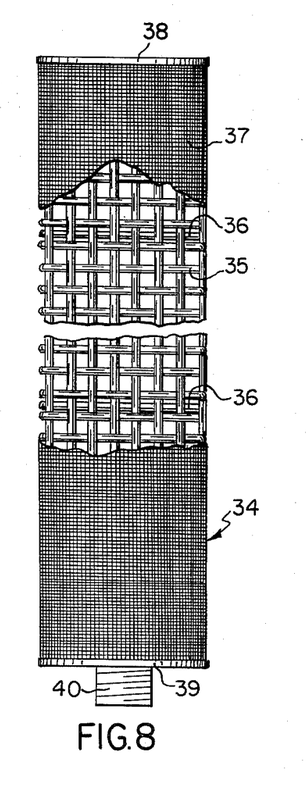
FIG. 8 is a elevational view partly broken away and greatly enlarged showing one of the filter elements shown in FIG. 1.

The preferred filter elements for use in the system of this invention are shown at 34 in FIGS. 1 and 8. Each element comprises an inner foundation or core layer of silicon-bronze wire of about 0.062 inches in diameter and between about ⅛ inch and ¼ inch mesh screen. One embodiment uses five meshes per inch. Each foundation layer 35 is reinforced at separate points along its length by rings 36 welded to the coarse screen. Each element is covered by a fine mesh outer layer 37 of screen material sufficiently fine to receive and hold diatomaceous silica. A preferred embodiment forms this outer layer of stainless steel flattened dutch weave between about 20× 120 mesh and 30× 130 mesh welded to the inner layer 35. Each of the cylinder elements 34 is preferably between 4 inches and 4½ inches in diameter and between about 30 inches and about 36 inches in length. Other sizes and shapes of filter elements have been tried but none other has been found which out-performs the above described element. The upper end of each cylindrical filter element is closed with an imperforate flat bronze plate 38 which is welded to the cylindrical element. The bottom of each filter element is closed by welding an annular plate 39 to the cylindrical element, this plate having a central opening and at this point has a threaded member attached as shown at 40.

A plurality of the above disclosed filter elements are assembled in rows along manifold pipes 41 which are secured in parallel relationship along an outlet header 42. Each filter element 34 has its threaded end 40 screwed into suitable openings in the manifold pipes 41, preferably with a dielectric gasket to prevent stray element currents.

Figure 9:
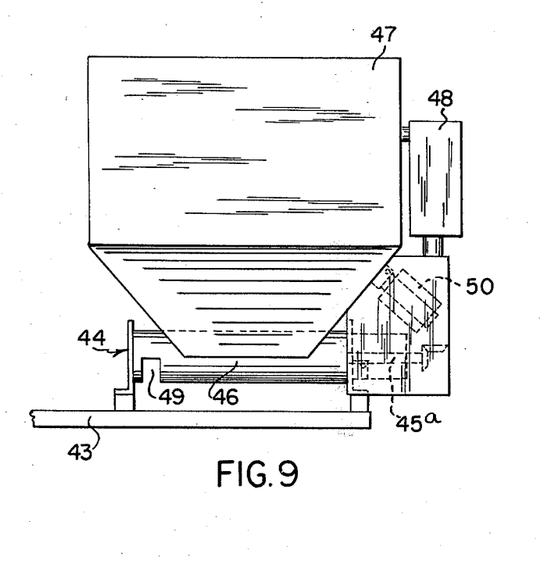
FIG. 9 is an elevational view, enlarged, taken along the line 9—9 of FIG. 1 and showing the diatomaceous silica slurry feeder.
Figure 10:
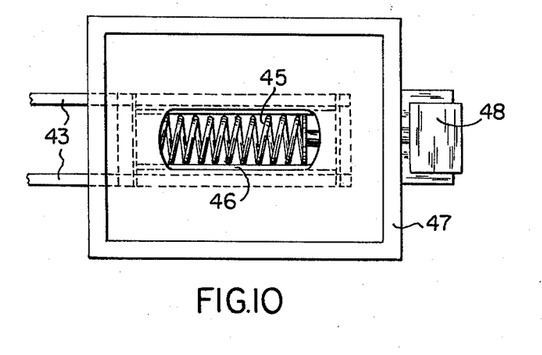
FIG. 10 is a top plan view of the same.
Figure 11:
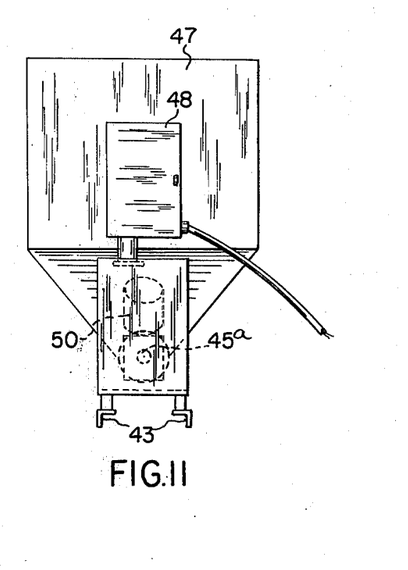
FIG. 11 is an end view taken from the right-hand side of FIG. 9.

Means is provided for feeding diatomaceous silica dry slurry into the tank 15. Suitable mechanism is shown generally in FIGS. 1, 2 and 3 and more in detail in FIGS. 9, 10 and 11. Supported on bars 43 which are firmly connected to tank 15, is a helical feeder 44 which has a rotatable helical member 45 encased in a cylindrical housing 46 which is open at the top to the dry slurry material in the hopper 47. An electric motor in housing 48 drives the shaft 45a which turns the helical screw 45 and carries the slurry material through the housing 46, allowing it to drop out at a discharge opening 49 so as to fall into the tank 15. If necessary, an electric vibrator 50 is positioned to strike against the sloping sides of the hopper 47 as clearly seen in FIGS. 9 and 11.

In using the diatomaceous silica feeder, the tank 15 is first filled with water to a level above the top of the filter elements 34, after which all valves are shut off except a valve controlling the flow from the header 42 through the recycling pump 52 and then through lines 53 and 54 into the tank 15. At this time, the valve at 55 is opened. The variable speed motor in housing 48 is then started by a timer in the same housing at a selected speed and a slurry of diatomaceous silica is introduced into the filter chamber compartment to be deposited uniformly over the surface of the filter elements. A precoating operation consists of allowing the fines of slurry material to penetrate the screen elements 37 and 35, the heavier particles of the slurry being captured by the screen and the fines being returned to the filter tank by means of the recycling circuit 42, 52, 53, 54, thus building a diatomaceous silica cake of heavy material close to the screen 37 with a layer of fines on top of the heavy material. During subsequent operation of the filter, the water is drawn by the recycling pump 52 in parallel through all of the filter elements 34, through the manifold lines 41 and through the header 42 and then out the clean filter line 56 back to the pool. The precoat on the filter elements may be augumented by continuous feeding of a small amount of diatomaceous silica during the filter operation from the hopper 47 through the housing 46 as previously described. However, this is usually not a continuous operation but an intermittent operation.

The preferred back-wash operation of the filter elements 34 is carried out by exploding compressed air in a reverse direction through the filter elements so as to drive the spent diatomaceous silica radially outwardly from the screens 37. To this end, a compressed air reservoir 57 is provided in a location near the tank 15 and this provided with a self-contained air compressor 58 either mounted on top of the tank 57 or close thereby. From reservior 57 a compressed air discharge line 59, controlled by a quick opening valve 60, leads to a point 61 where the line is tapped into the header 42. Then, when dirt from the pool gradually builds up a differential pressure across the filter elements until the recirculating pump 52 is drawing a vaccum of approximately ten inches, the filter is shut down, the quick opening valve 60 is opened and the compressed air, usually at 40 pounds per square inch, is released suddenly and flows through the header 42, the manifold pipes 41 and all of the filter elements 34 in a ram-jet sort of operation which blows the caked diatomaceous silica material off of the screens 37 where it falls to the bottom of the compartment 15b. It is recommended that this back-wash valve 60 be opened for two seconds, closed for 10 seconds, and then repeated opening again for 6 seconds, after which valve 60 is closed. This intermittent operation allows a forward and backward thrust of the water in the tank assuring through cleaning of the filter elements.

Preferably, the top of tank 15 is open or covered in a manner to permit seeing therethrough. Then an operator on the catwalk 62 can see whether all of the filter elements 34 are clean, and may take a hose and hose down any remaining material on the outer faces of the screens 37, flushing the same to the bottom of the tank and out a drain pipe 63 to a floor drain 64, opening valve 65 for this purpose. Then the next precoat operation is carried out and the filter is ready for use again.

Figure 7:
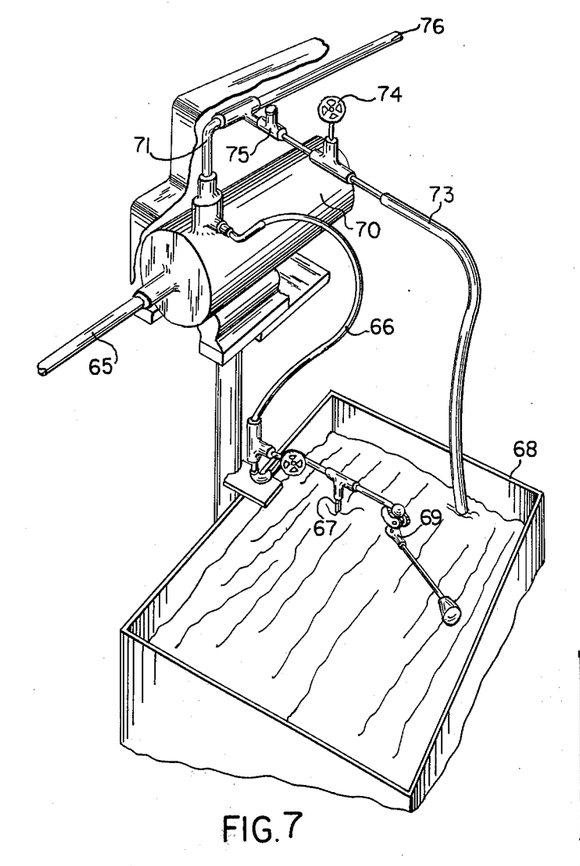
FIG. 7 is a perspective view of a hypochlorinator used in the system.

For best results, a chlorinator, either of the gaseous or hypo type, should have a discharge line placed in the down-stream piping from the recirculating pump 51 between a flow meter and the pool. This location provides a concentrated chlorine insertion in the water being pumped to the pool, causing adequate mixing and sufficient time lapse before it re-enters the pool through the inlet fittings. A hypochlorinator is shown in FIGS. 1 and 7. This consists of a feed line of water 76 under pressure which connects on the outlet side of the recirculating pump 52. This drives a positive feed pump 70 which through hose 66 discharges at 67 into the chemical tank 68 under control of a float valve 69 which maintains a predetermined level in the tank 68. The water flow through 76 and line 71 through a venturi 72 causes a suction in hose 73, the lower end of which is embedded in the liquid in the tank 68. This flow is controlled by hand valve 74 and a check valve at 75 so as to control the predetermined amount of chlorine solution in the pipe 71 which connects into pipe 65, through pump 70, leading back to the pool.

If needed or desirable, a heat exchanger is supplied as an integral part of the equipment. Such a heat exchanger is shown at 80 in FIGS. 1, 12, 13 and 14. The preferred location for this heat exchanger is in the stilling chamber 15a as shown in FIG. 1. The heat exchanger shown here consists of an upper header 81, and a lower header 92 connected by a large number of smaller diameter tubes 83 and supplied with steam or hot water from a suitable boiler utilizing an inlet connection 84 to header 81 and an outlet connection 85 from header 82. Preferably, this heat exchanger is made of copper and the smaller tubes 83 may be ⅝ inch diameter pipe. All of the parts 81, 82 and 83 are connected together as shown in a leak-proof manner.

Make-up water to maintain the desired water level in the entire system enters through line 86 under control of the valve V1. This line ends at least 6 inches above the level of the water in the tank 15 so as to prevent any back suction of water out of the tank 15 under any conditions.

The diatomaceous silica used in preferably Celite 545, a Johns-Manville Sales Corp. product, Dicalite 4200, a product of Dicalite Co., or equal, using a minimum quantity of about ten ounces per filter element fed into the stilling chamber. This diatomaceous silica, being the fossil-like skeleton of oceanic plants is a splendid filter medium for the reason that, although as fine as cake flour in appearance, it has the general make-up and structure under a microscope of snow flakes. This irregular characteristic allows a free passage of the water through it so fine that the water can be polished down to 1 micron, as against 43 microns using a sand filter.

The number of filter elements 34 provided in the tank portion 15b are arranged according to the load to be handled. An average figure is about 8-½ gallons per minute handled for each filter element. As shown in FIG. 1, free space is allowed between adjacent filter elements.

A timer is supplied on the diatomaceous silica feeder drive for the feeder worm 46 to control the rate of feed for a predetermined set period of time as desired.

A timer is also provided for controlling the air compressor 58 which fills the reservoir 57 and which is set to cut off at 40 pounds per square inch. A number of successful installations utilize a reservoir 57 of about 16 cubic foot capacity.

Suitable gauges are provided where needed that are not shown in the drawings as they have no part to play in the novelty of the present invention. For instance, there is a vacuum gauge on the inlet to pump 52 and a pressure gauge on the outlet therefrom. Usually the vacuum gauge shuts down the operation of pump 52 when it reaches ten inches of vacuum so as to indicate to the operator that it is time to back-wash.

A rate of flow gauge is provided in the return flow line 56 downstream from the control valve V2 so that the flow of water back to the pool may be carefully controlled.

There is also a compressed air pressure indicator connected with the reservoir 57.

The operation of the system according to this invention for a filter at deck level or below is as follows. The operator first opens recycle valve V3. He then opens the make-up water valve V1 and allows water to flow into the filter tank 15 until the water reaches the desired level and then closes valve V1. The recycyling pump 52 is then started. Diatomaceous silica in the amount of at least ten ounces per filter element is then dropped into the stilling chamber 15a. At this time, the water valve V2 in the return line 56 is closed. The water in the filter tank is allowed to refilter until the diatomaceous silica is evenly coated on all of the filter elements 34 and the circulating water is clear. Then the make-up valve V1 is opened, the downstream water valve V2 is opened until the flow meter shows the desired rate of flow. Then the recycle valve V3 is closed. The filter is now operating, bringing water from the pool and returning clean filtered water to the pool. As the filter operates, it will accumulate oils and silts and other debris from the pool on the exterior of the filter elements. If the slurry feeder is operating, this will delay the clogging of the filter-aid pores, but as the debris is captured thereon, the vacuum gauge installed on the suction side of the recirculating pump 52 will increase to approximately 10 inches of vacuum. The filter is then ready to be backwashed. The valve V2 is then closed and the compressed air valve V4 is suddenly opened, thus causing the compressed air to push the water in the header 42 and the manifold lines 41 through the interior hollow spaces of the filter elements 34 causing a ram-jet action in each filter element and removing the diatomaceous silica cake from the outside of the screens 37. This action is preferably repeated in a sequence of 2 seconds on, 10 seconds off, and again six on, after which the air valve V4 is closed. This back-washing action is usually accomplished with the water level in the tank pulled down to approximately 3 inches below the bottom of the leaf and lint interceptor 33. The drain valve V5 is then opened to drain off the material in the bottom of the filter tank. A garden hose may then be used to wash any clinging debris off the filter elements and off of the tank in a thorough manner. All spent diatomaceous silica material should be washed down the drain, after which the drain valve V5 is closed. The debris is then cleaned off the leaf and lint interceptor screen 33 and any debris should be cleaned from the stilling chamber 15a. Then the operator is ready to repeat the precoating of the filter elements and putting the filter back into operation. With the top of tank 15 open to the vision of the operation on catwalk 62, it can always be determined when all of the filter elements are thoroughly cleaned.

If the installation of the filtration system of this invention is above deck, a second pump is furnished which draws water from the pool to the filter. Also, an exterior hair and lint strainer is provided ahead of this pump to protect it from damage by large particles from the pool. It would then be necessary to start this additional pump everytime one opens the incoming water valve V1, and to shut this second pump down everytime one closes the incoming water valve V1. The rest of the operation is the same as described above.

What is claimed is:

1. A pool filtering system including a two-part filter tank with a partition between the parts, the first part of the tank forming a stilling chamber and the second part forming a filter element tank, two inlet lines leading from a pool to said stilling chamber, one inlet line communicating with the bottom of the pool and the other line communicating with a wave trough of the pool, a plurality of vertical filter elements in said filter element portion of said tank, each of said filter elements having over substantially its entire length an inner strong coarse perforate metallic layer completely covered by a fine mesh outer layer sufficiently fine to receive and hold diatomaceous silica, each cylinder having an imperforate top at its upper end and having a bottom closure at its lower end with a single through opening, a manifold including a main line and branch lines communicating therewith in the bottom of said second portion of said tank, said filter elements having detachable connections with suitable openings in said manifold branches, each of said filter elements being sufficiently strong to withstand a pressure differential of about 150 pounds per square inch, a recirculating pump connected with said manifold line as an inlet and with an outlet line leading to said pool, a control valve where each of said inledt lines enters into said stilling chamber, a control valve there comprising a valve seat having a continuous annular ridge of uniform height extending at a vertical plane and a coacting valve having a continuous flat surface in a parallel vertical plane opposite said ridge, a valve actuator comprising a generally horizontal toggle having one link with a pivotal connection fixed relative to said flat surface and having another link with a pivotal connection fixed relative to said tank and said links having a common pivotal connection with a strut extending from said connection upwardly, a float for controlling each of said inlet lines independently, an arm adjustable as to length and extending between each of said floats and a point fixed relative to said tank, the upper end of said strut being pivotally connected to said arm, a continuous regulated feeder for diatomaceous silica mounted above said tank and discharging thereinto, means for recycling water containing diatomaceous silica directly out of and back into said tank while forming an outer coating of diatomaceous silica on said filter elements, a compressed air reservoir, means for providing a supply of compressed air in said reservoir, a back-wash line leading from said reservoir to said manifold, a quick-opening valve in said back-wash line and means for isolation said manifold from said inlet and outlet lines during back-wash, whereby to intermittently explode said air in all of said filter elements outwardly to remove the dirt-contaminated diatomaceous silica outer coating from said filter elements when necessary, said tank being open at the top whereby to inspect said filter elements and to wash the same with a hose to remove diatomaceous silica particles after back-washing when necessary, and a drain from the bottom of said tank for removing said waste diatomaceous silica material.

2. A pool filtering system including a filter tank, at least one inlet line from a pool to said tank, a plurality of vertically positioned filter elements in said tank, a manifold communicating with the lower ends of said filter elements, a recirculating pump having an inlet in communication with said manifold creating a suction in said filter elements and having an outlet line leading to said pool, said filter elements each having an outer of sufficiently fine mesh to retain an outer coating of diatomaceous silica, a continuous regulated feeder for deatomaceous silica mounted above said tank and discharging thereinto, means for recycling water containing diatomaceous silica directly out of and back into said tank while forming said outer coating on said filter elements, a compressed air reservoir, means for providing a supply of compressed air in said reservoir, a back-wash line leading from said reservoir to said manifold, a quick-opening valve in said back-wash line and means for isolating said manifold from said inlet and outlet lines during back-wash, whereby to intermittently explode said air in all of said filter elements outwardly to remove the dirt-contaminated diatomaceous silica outer coating from said filter elements when necessary, wherein said pool is a swimming pool having a wave trough, two of said inlet lines are provided, one communicating with the main body of water in said pool, and the other communicating with said wave trough, valves controlling the flow from each of said inlet lines respectively into said tank, and float control means, one for each valve, adjustable according to water level in said tank, and wherein said filter tank compresses two parts, one communicating directly with said inlet lines and serving as a stilling chamber and surge tank, and the other of said parts housing said filter elements, and wherein said two parts are side-by-side, a solid partition separating said parts, and a removable screen interceptor for large debris forming an upper portion of said partition at a zone just above said solid partition.

3. A pool filtering system including a filter tank, at least one inlet line from a pool to said tank, a plurality of vertically positioned filter elements in said tank, a manifold communicating with the lower ends of said filter elements, a recirculating pump having an inlet in communication with said manifold creating a suction in said filter elements and having an outlet line leading to said pool, said filter elements each having an outer layer of sufficiently fine mesh to retain an outer coating of a diatomaceous silica, a continuous regulated feeder for diatomaceous silica mounted above said tank and discharging thereinto, means for recycling water containing diatomaceous silica directly out of and back into said tank while forming said outer coating on said filter elements, a compressed air reservoir, means for providing a supply of compressed air in said reservoir, a back-wash line leading from said reservoir to said manifold, a quick-opening valve in said back-wash line and means for isolating said manifold from said inlet and outlet lines during back-wash, whereby to intermittently explode said air in all of said filter elements outwardly to remove the dirt-contaminated diatomaceous silica outer coating from said filter elements when necessary, wherein said pool is a swimming pool having a wave trough, two of said inlet lines are provided, one communicating with the main body of water in said pool, and the other communicating with said wave trough, valves controlling the flow from each of said inlet lines respectively into said tank, and float control means, one for each valve, adjustable according to water level in said tank, and wherein each of said valves compreses a valve seat having a continuous annular ridge of uniform height and a coacting valve having a continuous flat surface in a vertical plane opposite said ridge, a valve actuator comprising a generally horizontal toggle having one link with a pivotal connection fixed relative to said flat surface and having another link with a pivotal connection fixed relative to said tank and said links having common pivotal connection with a strut extending from said pivotal connection upwardly, a float arm adjustable as to length and extending between said float and a pivot fixed relative to said tank, and the upper end of said strut pivotally connected to said arm, whereby vertical motion of said float upon water in said tank causes horizontal opening and closing of said valve on its seat, and debris caught between said valve and said seat may fall downwardlly upon continued valve movement.

* * * * *

PO-1050
(5/69)

UNITED STATES PATENT OFFICE
CERTIFICATE OF CORRECTION

Patent No. __3,969,248__  Dated __July 13, 1976__

Inventor(s) __Charles C. Whitmer__

It is certified that error appears in the above-identified patent and that said Letters Patent are hereby corrected as shown below:

Column 7, line 10, "isolation" should be -- isolating --.
Column 7, line 28, the word "layer" should be inserted after the word -- outer --.

Signed and Sealed this

Second Day of November 1976

[SEAL]

Attest:

RUTH C. MASON
Attesting Officer

C. MARSHALL DANN
Commissioner of Patents and Trademarks